United States Patent
Cohen

(10) Patent No.: US 8,996,399 B1
(45) Date of Patent: Mar. 31, 2015

(54) PRODUCT PROMOTION METHODS AND ASSOCIATED SYSTEMS

(75) Inventor: Andrew H. Cohen, Manalapan, NJ (US)

(73) Assignee: Million Dollar Mix, LLC, Manalapan, NJ (US)

( * ) Notice: Subject to any disclaimer, the term of this patent is extended or adjusted under 35 U.S.C. 154(b) by 735 days.

(21) Appl. No.: 11/754,434

(22) Filed: May 29, 2007

(51) Int. Cl.
*G06Q 30/00* (2012.01)
*G06Q 30/02* (2012.01)

(52) U.S. Cl.
CPC .................................. *G06Q 30/0217* (2013.01)
USPC .................. 705/14.19; 705/14.12; 705/14.36; 705/14.4; 705/14.1; 463/25

(58) Field of Classification Search
CPC .......... G06Q 30/0212; G06Q 30/0231; G06Q 30/0232; G06Q 30/0234; G06Q 30/0235; G06Q 30/0238
USPC ........... 705/1, 14; 364/401, 405, 412; 463/40, 463/41, 42, 16, 17; 273/139, 138, 138 A; 186/52, 61
See application file for complete search history.

(56) References Cited

U.S. PATENT DOCUMENTS

| | | |
|---|---|---|
| 4,993,714 A | 2/1991 | Golightly |
| 5,368,129 A | 11/1994 | Von Kohorn |
| 5,791,991 A | 8/1998 | Small |
| 6,048,268 A | 4/2000 | Humble |
| 6,061,660 A * | 5/2000 | Eggleston et al. .............. 705/14 |
| 7,016,861 B2 | 3/2006 | Mothwurf |
| 2002/0143626 A1* | 10/2002 | Voltmer et al. ................. 705/14 |
| 2003/0177066 A1* | 9/2003 | Zhang et al. .................... 705/14 |
| 2006/0053056 A1* | 3/2006 | Alspach-Goss et al. ........ 705/14 |
| 2006/0189372 A1 | 8/2006 | Westrup et al. |
| 2007/0192195 A1* | 8/2007 | Asmar et al. .................... 705/14 |
| 2007/0198354 A1* | 8/2007 | Senghore et al. ............... 705/14 |

* cited by examiner

*Primary Examiner* — James A Reagan
(74) *Attorney, Agent, or Firm* — Greenberg Traurig, LLP

(57) ABSTRACT

One embodiment of the present invention relates to a product promotion method. Another embodiment of the present invention relates to a product promotion system. In one specific example, the present invention provides a product promotion method, comprising: selecting at least one winning prize for the product promotion; selecting a time period over which the product promotion will be run; selecting a number of prize-winning items that are sold in a store; and providing at least a portion of the winning prize to a person who purchases from the store, during the time period over which the product promotion will be run, all of the selected prize-winning items.

20 Claims, 3 Drawing Sheets

PRODUCT PROMOTION METHODS AND ASSOCIATED SYSTEMS

FIELD OF THE INVENTION

One embodiment of the present invention relates to a product promotion method.

Another embodiment of the present invention relates to a product promotion system.

In one specific example, the present invention provides a product promotion method, comprising: selecting at least one winning prize for the product promotion; selecting a time period over which the product promotion will be run; selecting a number of prize-winning items that are sold in a store; and providing at least a portion of the winning prize to a person who purchases from the store, during the time period over which the product promotion will be run, all of the selected prize-winning items.

BACKGROUND OF THE INVENTION

Various lottery and promotion systems and methods have been proposed. Examples include what is described in the disclosures of the following patent application publication and patents:

United States Patent Application Publication 2006/0189372, in the name of Westrup et al.; U.S. Pat. No. 7,016,861, in the name of Mothwurf; U.S. Pat. No. 6,048,268, in the name of Humble; U.S. Pat. No. 5,791,991, in the name of Small; U.S. Pat. No. 5,368,129, in the name of Von Kohorn; and U.S. Pat. No. 4,993,714, in the name of Golightly.

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

Figure 1:
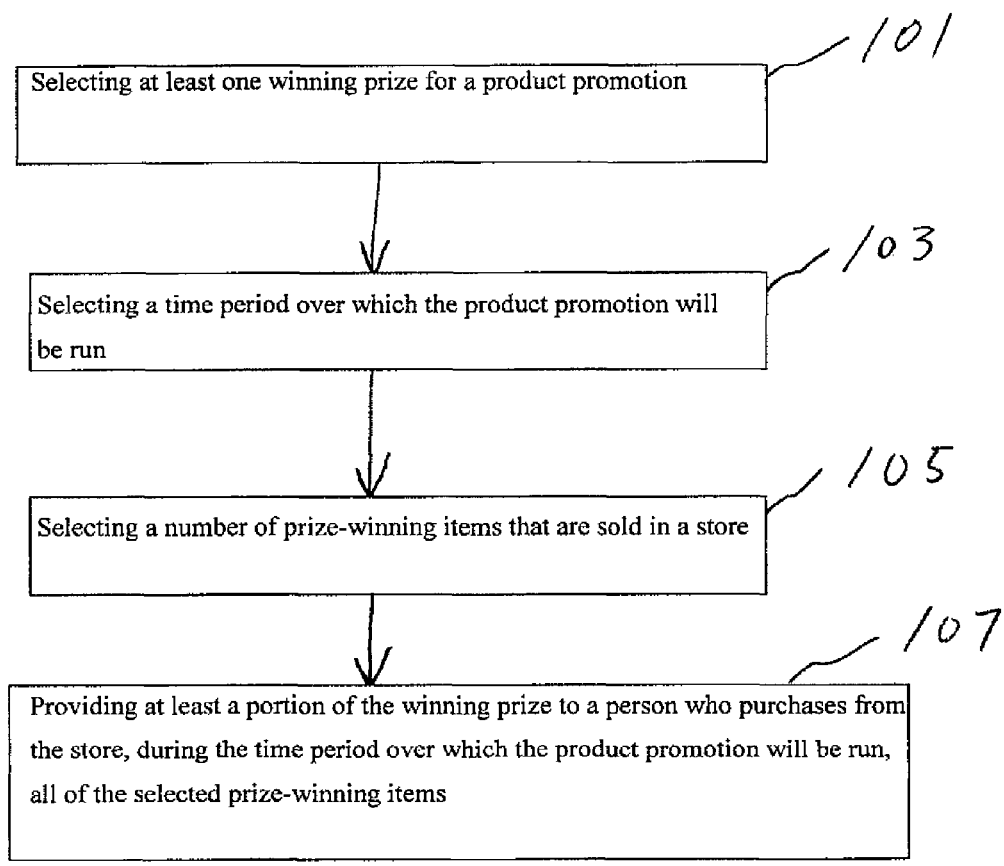
FIG. 1 shows one embodiment of the present invention directed to a product promotion method.

Referring now to FIG. 1, one embodiment of the present invention directed to a product promotion method is provided. As seen in this FIG. 1, the method may comprise: selecting at least one winning prize for the product promotion (Step 101); selecting a time period over which the product promotion will be run (Step 103); selecting a number of prize-winning items that are sold in a store (Step 105); and providing at least a portion of the winning prize to a person who purchases from the store, during the time period over which the product promotion will be run, all of the selected prize-winning items (Step 107). Step 107 may comprise the end of the product promotion, such that the act of the purchaser purchasing all of the selected items constitutes the winning event, with no further lottery, drawing or the like taking place or being required. Of course, the steps may be carried out in the order recited above or the steps may be carried out in any other desired order. Further, the store may be a single retail outlet or multiple retail outlets of the same chain.

In one example, the entire winning prize may be provided to the first person who purchases from the store, during the time period over which the product promotion will be run, all of the selected prize-winning items (this may be accomplished, for example, by a given purchaser over a number of different shopping events or checkouts).

In another example, the entire winning prize may be provided to the first person who purchases from the store, all at one time (that is, during a single shopping event or checkout), all of the selected prize-winning items.

In another example, one or more people may share the prize (wherein the prize may be divided evenly or unevenly among the winner(s)). In one specific example, the a first winner may get the largest share of the prize, a second winner (that is, a purchaser who makes the required purchases, but after the first winner has done so) may get a smaller share of the prize and a third winner (that is, a purchaser who makes the required purchases, but after the first winner and the second winner have done so) may get an even smaller share of the prize.

In another example, the winning prize may be provided by an underwriting entity. In one specific example, the underwriting entity may be distinct from an entity that owns the store. In another specific example, the underwriting entity may be an insurance company.

In another example, the winning prize may be between $1,000 and $1,000,000.

In another example, the time period over which the product promotion will be run may be between one week and one year.

In another example, the number of prize-winning items selected may be between 3 and 10.

In another example, the store may be a retail store.

In another example, the store may be an online store.

In another example, the underwriting entity may select the prize-winning items. In one specific example, the underwriting entity may randomly select the prize-winning the items. In another example, each of the prize winning items may have a similar chance of being purchased.

In another example, the underwriting entity may select the time period over which the product promotion will be run.

In another example, the store may select the prize-winning items. In one specific example, the store may randomly select the prize-winning the items.

In another example, the store may select the time period over which the product promotion will be run.

In another example, a promotion entity distinct from the store may select the prize-winning items (such a promotion entity may be paid, for example, by the store and or one or more product brands and may act as an intermediary between the store and the underwriting entity). In one specific example, the promotion entity may randomly select the prize-winning the items. In another example, each of the prize winning items may have a similar chance of being purchased.

In another example, a promotion entity distinct from the store may select the time period over which the product promotion will be run.

In another example, each of the selected prize-winning items may be identified by a distinct SKU number.

In another example, each of the selected prize-winning items may be identified by a distinct UPC code.

In another example, each of the selected prize-winning items may be identified by a distinct SKU number or a distinct UPC code.

In another example, each of the selected prize-winning items may be a specific product and brand and size.

In another example, each of the selected prize-winning items may be a specific product and brand (regardless of size).

In another example, each of the selected prize-winning items may be a specific product (regardless of brand and size).

Figure 2:
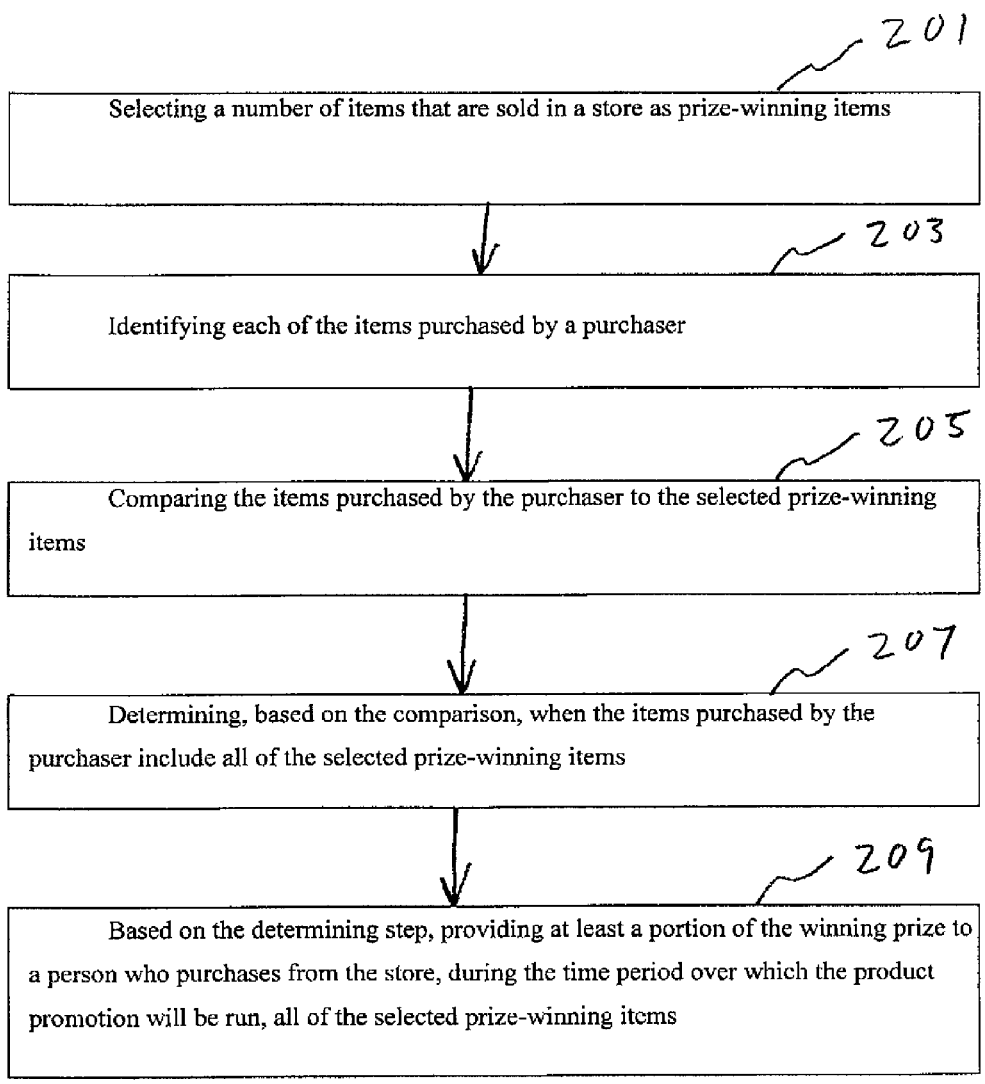
FIG. 2 shows one embodiment of the present invention directed to a computer implemented product promotion method.

Referring now to FIG. 2, one embodiment of the present invention directed to a computer implemented product promotion method is provided. As seen in this FIG. 2, the method may comprise: selecting a number of items that are sold in a store as prize-winning items (Step 201); identifying each of the items purchased by a purchaser (Step 203); comparing the items purchased by the purchaser to the selected prize-winning items (Step 205); determining, based on the comparison, when the items purchased by the purchaser include all of the selected prize-winning items (Step 207); and based on the determining step, providing at least a portion of the winning prize to a person who purchases from the store, during the time period over which the product promotion will be run, all of the selected prize-winning items (Step 209). Step 209 may comprise the end of the product promotion, such that the act of the purchaser purchasing all of the selected items constitutes the winning event, with no further lottery, drawing or the like taking place or being required. Of course, the steps may be carried out in the order recited above or the steps may be carried out in any other desired order. Further, the store may be a single retail outlet or multiple retail outlets of the same chain.

In one example, the entire winning prize may be provided to the first person who purchases from the store, during the time period over which the product promotion will be run, all of the selected prize-winning items (this may be accomplished, for example, by a given purchaser over a number of different shopping events or checkouts).

In another example, the entire winning prize may be provided to the first person who purchases from the store, all at one time (that is, during a single shopping event or checkout), all of the selected prize-winning items.

In another example, one or more people may share the prize (wherein the prize may be divided evenly or unevenly among the winner(s)). In one specific example, the a first winner may get the largest share of the prize, a second winner (that is, a purchaser who makes the required purchases, but after the first winner has done so) may get a smaller share of the prize and a third winner (that is, a purchaser who makes the required purchases, but after the first winner and the second winner have done so) may get an even smaller share of the prize.

Figure 3:
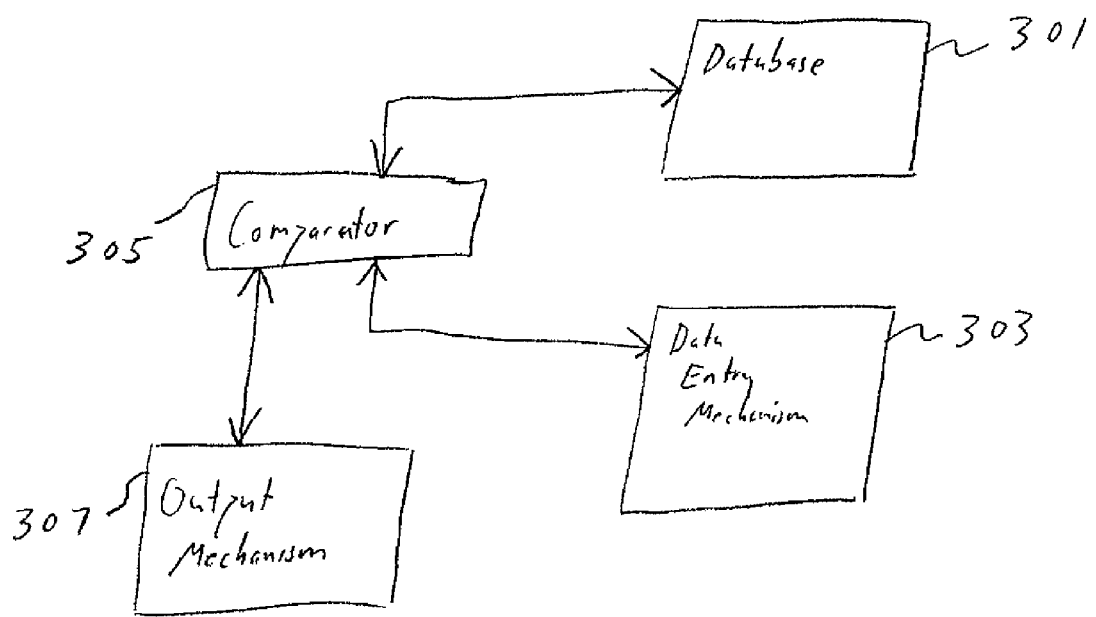
FIG. 3 shows one embodiment of the present invention directed to a computer system for product promotion.

Referring now to FIG. 3, one embodiment of the present invention directed to a computer system for product promotion is provided, comprising: database 301 containing data identifying a time period over which the product promotion will be run and data identifying each of a number of items that are sold in a store that have been selected as prize-winning items; data entry mechanism 303 obtaining data identifying each of the items purchased by a purchaser at the store; comparator 305 operatively connected to database 301 and data entry mechanism 303 comparing the items purchased by the purchaser to the selected prize-winning items; and output mechanism 307 operatively connected to comparator 305, wherein output mechanism 307 indicates, based on the comparison, when the items purchased by the purchaser at the store include all of the selected prize-winning items. Further, the store may be a single retail outlet or multiple retail outlets of the same chain. The indication may comprise the end of the product promotion, such that the act of the purchaser purchasing all of the selected items constitutes the winning event, with no further lottery, drawing or the like taking place or being required.

In one example, database 301 may comprise a local database (e.g., integrated into a point-of-sale ("POS") terminal).

In another example, database 301 may comprise a remote database (e.g., a database remote from a POS terminal and accessible via an intranet and/or the Internet).

In another example, data entry mechanism 303 may comprise a scanner (e.g., integrated into a POS terminal).

In another example, data entry mechanism 303 may comprise a keyboard for manual data entry (e.g., integrated into a POS terminal).

In another example, comparator 305 may comprise a CPU and associated software (e.g., integrated into a POS terminal).

In another example, output mechanism 307 may comprise a display, such as a CRT display, an LCD display, a plasma display, and/or a printer (one or both of which may be integrated into a POS terminal).

In another example, there may be a "no purchase necessary" component (e.g., consumers could mail in (without making a purchase) a 3×5 card listing various SKU numbers and/or UPC codes—if the listing on the card of the various SKU numbers and/or UPC codes matched the selected prize-winning items then the consumer mailing in the card would win).

Reference will now be made to another specific example (this example is, of course, intended to be illustrative and not restrictive). Under this specific example, a retailer randomly selects items (e.g., 5 items) and asks consumers to purchase products for a product promotion or lottery. The prize-winning items of this example are: 20 oz Diet PEPSI, 20 pack of CERTS mints, HOSTESS TWINKEES twinpack, 12 pack of GILETTE razor blades, and a gallon size WINDEX. The first consumer to purchase this exact combination of products (e.g., in a single shopping trip or checkout) wins $1,000,000. A capped amount of purchasable items may be put into the official rules (e.g., to be eligible to win the prize the consumer can purchase a maximum of 50 items per shopping trip or checkout). In one example, an underwriting entity (e.g., an insurance company) may specify the capped amount of purchasable items.

Of note, the embodiments described herein may, of course, be implemented using any appropriate computer hardware and/or computer software. In this regard, those of ordinary skill in the art are well versed in the type of computer hardware that may be used (e.g., a mainframe, a mini-computer, a personal computer ("PC"), a network (e.g., an intranet and/or the Internet)), the type of computer programming techniques that may be used (e.g., object oriented programming), and the type of computer programming languages that may be used (e.g., C++, Basic, AJAX, Javascript, ADOBE FLASH). The aforementioned examples are, of course, illustrative and not restrictive.

While a number of embodiments of the present invention have been described, it is understood that these embodiments are illustrative only, and not restrictive, and that many modifications may become apparent to those of ordinary skill in the art. For example, certain methods may have been described herein as being "computer implementable" or "computer implemented". In this regard, it is noted that while such methods can be implemented using a computer, the methods do not necessarily have to be implemented using a computer. Also, to the extent that such methods are implemented using a computer, not every step must necessarily be implemented using a computer. Further, any communication carried out between components may be carried out, for example, via an intranet and/or the Internet. Further still, the present invention may be applied to the promotion of one or more services and/or the promotion of one or more products. Further still, the various steps may be carried out in any desired order (and any desired steps may be added and/or any desired steps may be eliminated).

What is claimed is:

1. A product promotion method, performed in a computing system, comprising:
   prior to running at least one product promotion, storing, in a database in the computer system, product promotion criteria of at least one product promotion, comprising:
   i) a first data about at least one winning prize for the at least one product promotion;
   ii) a second data about a promotional time period over which the at least one product promotion runs;
   iii) a third data about at least three promotion participating products to be part of the at least one product promotion,
      1) wherein the at least three promotion participating products are selected from products offered by at least one store,
      2) wherein each promotion participating product has a different unique product identifying number and is of a different product brand than any other promotion participating product of the at least three promotion participating products,
      3) wherein no identification information of the at least three promotion participating products is disclosed to participants before unique product identifying numbers of the at least three promotion participating products offered at the at least one store are received from the participants during the promotional time period,
      4) wherein each promotion participating product is determined based, at least in part, on a chance of being selected by the participants from the products offered by the at least one store, hereby resulting in winning the at least one winning prize, and
      5) wherein the at least one winning prize is:
         i) awarded to a first winning participant from whom the unique product identifying numbers of the at least three promotion participating products offered at the at least one store are received during the promotional time period over which the at least one product promotion runs, or
         ii) distributed among a group of winning participants, wherein the unique product identifying numbers of the at least three promotion participating products offered at the at least one store are received from each winning participant during the promotional time period over which the at least one product promotion runs;
   receiving, by the computer system, at least three unique product identifying numbers associated with at least three products offered by the store from the at least one participant;
   during the promotional time period over which the at least one product promotion runs as identified by the second data of the product promotion criteria of the at least one product promotion, comparing, by the computer system, the at least three unique product identifying numbers to the third data about the at least three promotion participating products identified in the product promotion criteria of the at least one product promotion;
   determining, by the computer system, a match between the at least three unique product identifying numbers and the third data about the at least three promotion participating products identified in the product promotion criteria of the at least one product promotion;
   upon the match, outputting, by the computer system, based on the product promotion criteria of the at least one product promotion, at least one notification, identifying that the at least one participant is at least one winning participant; and
   based on the product promotion criteria of the at least one product promotion and upon the match, ending, by the computer system, the at least one product promotion, by:
      i) distributing the at least one winning prize to the at least one winning participant who is the first winning participant, or
      ii) distributing at least a portion of the at least one winning prize to the at least one winning participant so that the at least one winning prize is distributed among the group of the winning participants, wherein the unique product identifying numbers of the at least three promotion participating products offered at the at least one store are received from each winning participant during the promotional time period.

2. The method of claim 1, wherein the at least one winning prize is provided by an underwriting entity.

3. The method of claim 2, wherein the underwriting entity is distinct from an entity that owns the at least one store.

4. The method of claim 2, wherein the underwriting entity is an insurance company.

5. The method of claim 2, wherein the at least three promotion participating products are identified by the underwriting entity.

6. The method of claim 1, wherein the promotional time period over which the product promotion runs is between one week and one year.

7. The method of claim 1, wherein the at least three promotion participating products includes between 3 and 10 products offered by the at least one store.

8. The method of claim 1, wherein the at least one store is a retail store.

9. The method of claim 1, wherein the at least one store is an online store.

10. The method of claim 1, wherein the at least three promotion participating products are identified by the at least one store.

11. A computer-implemented system, comprising:
    at least one specifically programmed computer, comprising:
    a non-transient memory having at least one region for storing particular computer executable program code; and
    at least one processor for executing the particular program code stored in the memory, wherein the particular program code is configured so that the at least one specifically programmed computer is configured to perform at least:

prior to running at least one product promotion, storing, in a database, product promotion criteria of at least one product promotion, comprising:
  i) a first data about at least one winning prize for the at least one product promotion;
  ii) a second data about a promotional time period over which the at least one product promotion runs;
  iii) a third data about at least three promotion participating products to be part of the at least one product promotion,
    1) wherein the at least three promotion participating products are selected from products offered by at least one store,
    2) wherein promotion participating product has a different unique product identifying number and is of a different product brand than any other promotion participating product of the at least three promotion participating products,
    3) wherein no identification information of the at least three promotion participating products is disclosed to participants before unique product identifying numbers of the at least three promotion participating products offered at the at least one store are received from the participants during the promotional time period,
    4) wherein each promotion participating product is determined based, at least in part, on a chance of being selected by the participants from the products offered by the at least one store, hereby resulting in winning the at least one winning prize, and
    5) wherein the at least one winning prize is:
      i) awarded to a first winning participant from whom the unique product identifying numbers of the at least three promotion participating products offered at the at least one store are received during the promotional time period over which the at least one product promotion runs, or
      ii) distributed among a group of winning participants, wherein the unique product identifying numbers of the at least three promotion participating products offered at the at least one store are received from each winning participant during the promotional time period over which the at least one product promotion runs;

receiving at least three unique product identifying numbers associated with at least three products offered by the store from the at least one participant;

during the promotional time period over which the at least one product promotion runs as identified by the second data of the product promotion criteria of the at least one product promotion, comparing the at least three unique product identifying numbers to the third data about the at least three promotion participating products identified in the product promotion criteria of the at least one product promotion;

determining a match between the at least three unique product identifying numbers and the third data about the at least three promotion participating products identified in the product promotion criteria of the at least one product promotion;

upon the match, outputting, based on the product promotion criteria of the at least one product promotion, at least one notification, identifying that the at least one participant is at least one winning participant; and based on the product promotion criteria of the at least one product promotion and upon the match, ending the at least one product promotion, by:
  i) distributing the at least one winning prize to the at least one winning participant who is the first winning participant, or
  ii) distributing at least a portion of the at least one winning prize to the at least one winning participant so that the at least one winning prize is distributed among the group of the winning participants, wherein the unique product identifying numbers of the at least three promotion participating products offered at the at least one store are received from each winning participant during the promotional time period.

12. The computer-implemented system of claim 11, wherein the at least one winning prize is provided by an underwriting entity.

13. The computer-implemented system of claim 12, wherein the underwriting entity is distinct from an entity that owns the at least one store.

14. The computer-implemented system of claim 12, wherein the underwriting entity is an insurance company.

15. The computer-implemented system of claim 11, wherein the promotional time period over which the product promotion runs is between one week and one year.

16. The computer-implemented system of claim 11, wherein the at least three promotion participating products include between 3 and 10 products offered by the at least one store.

17. The computer-implemented system of claim 11, wherein the at least one store is a retail store.

18. The computer-implemented system of claim 11, wherein the at least one store is an online store.

19. The computer-implemented system of claim 11, wherein the at least three promotion participating products are identified by the underwriting entity.

20. The computer-implemented system of claim 11, wherein the at least three promotion participating products are identified by the at least one store.

* * * * *